US012162021B2

(12) United States Patent
Christmann et al.

(10) Patent No.: US 12,162,021 B2
(45) Date of Patent: Dec. 10, 2024

(54) APPARATUS FOR COMMINUTING POURABLE FEEDSTOCK AND METHOD FOR OPENING SUCH AN APPARATUS

(71) Applicant: Siempelkamp Maschinen- und Anlagenbau GmbH, Krefeld (DE)

(72) Inventors: Stefan Christmann, Boedingerhof (DE); Christoph Kaub, Zweibruecken (DE)

(73) Assignee: Siempelkamp Maschinen-und Anlagenbau GmbH, Krefeld (DE)

( * ) Notice: Subject to any disclaimer, the term of this patent is extended or adjusted under 35 U.S.C. 154(b) by 301 days.

(21) Appl. No.: 17/722,129

(22) Filed: Apr. 15, 2022

(65) Prior Publication Data

US 2022/0234050 A1 Jul. 28, 2022

Related U.S. Application Data

(63) Continuation of application No. PCT/EP2020/079261, filed on Oct. 16, 2020.

(30) Foreign Application Priority Data

Oct. 16, 2019 (DE) ..................... 10 2019 007 192.1

(51) Int. Cl.

*B02C 18/16* (2006.01)
*B02C 18/14* (2006.01)

(Continued)

(52) U.S. Cl.

CPC ............ *B02C 23/16* (2013.01); *B02C 18/144* (2013.01); *B02C 18/16* (2013.01); *B02C 18/186* (2013.01);

(Continued)

(58) Field of Classification Search

CPC . B02C 18/144; B02C 18/186; B02C 18/2216; B02C 18/146; B02C 18/162;

(Continued)

(56) References Cited

U.S. PATENT DOCUMENTS 2,756,002 A * 7/1956 Brake .................. B02C 13/282 241/285.3
3,756,519 A * 9/1973 Reynolds ................ B02C 18/14 241/73

(Continued)

FOREIGN PATENT DOCUMENTS

DE 10 2006 036 738 A1 2/2008
EP 1 371 420 A1 12/2003

(Continued)

*Primary Examiner* — Faye Francis

(74) *Attorney, Agent, or Firm* — Muncy, Geissler, Olds & Lowe, P.C.

(57) ABSTRACT

A device for comminuting pourable feedstock as well as a method for opening a device of this type. The device includes a housing, which encloses a comminution chamber, in which a rotor rotating around a rotation axis is arranged, the rotor being equipped with rotor tools over its circumference. A sieve holder, whose sieve extends along a circumferential section of the rotor, is used to separate the sufficiently comminuted material. The feedstock supplied to the rotor via a material infeed is removed from the device via a material discharge after being sufficiently comminuted. To improve accessibility to the interior of the device, it is proposed that, to open the housing, the sieve holder is pivotable around a first pivot axis from a closed first position into an open second position and additionally around a second pivot axis into a third position.

15 Claims, 12 Drawing Sheets

(51) Int. Cl.

| | |
|---|---|
| ***B02C 18/18*** | (2006.01) |
| ***B02C 18/22*** | (2006.01) |
| ***B02C 23/16*** | (2006.01) |

(52) U.S. Cl.
CPC ........ *B02C 18/2216* (2013.01); *B02C 18/146* (2013.01); *B02C 2018/162* (2013.01); *B02C 2018/188* (2013.01); *B02C 2023/165* (2013.01)

(58) Field of Classification Search
CPC .. B02C 18/16; B02C 2018/188; B02C 13/284
USPC ........................................................ 241/285.3
See application file for complete search history.

(56) References Cited

U.S. PATENT DOCUMENTS

| | | | | | |
|---|---|---|---|---|---|
| 4,002,302 | A * | 1/1977 | Miller | B02C 13/286 | 241/89 |
| 4,073,444 | A * | 2/1978 | Pav | B02C 18/144 | 241/73 |
| 4,385,732 | A * | 5/1983 | Williams | B02C 18/0084 | 241/73 |
| 4,609,157 | A | 9/1986 | Thieux | | |
| 4,982,904 | A * | 1/1991 | Greiner | B02C 13/284 | 241/73 |
| 5,199,666 | A * | 4/1993 | Williams | B02C 18/16 | 241/73 |
| 5,213,273 | A * | 5/1993 | Linnerz | B02C 13/31 | 241/73 |
| 5,746,377 | A * | 5/1998 | Gehrig | B02C 18/16 | 241/242 |
| 7,255,296 | B2 * | 8/2007 | Karlsson | B02C 18/144 | 241/73 |
| 7,600,708 | B2 * | 10/2009 | Karlsson | B02C 18/148 | 241/242 |
| 7,832,670 | B2 * | 11/2010 | Peterson | B02C 13/31 | 241/73 |
| 8,464,973 | B2 * | 6/2013 | Karlsson | B02C 18/148 | 241/285.3 |
| 9,573,137 | B2 * | 2/2017 | Van der Galien | B02C 4/34 | |
| 2005/0006509 | A1 * | 1/2005 | Karlsson | B02C 18/16 | 241/285.2 |

FOREIGN PATENT DOCUMENTS

| | | | |
|---|---|---|---|
| EP | 2 113 305 | A2 | 11/2009 |
| WO | WO 2010/005356 | A1 | 1/2010 |

* cited by examiner

APPARATUS FOR COMMINUTING POURABLE FEEDSTOCK AND METHOD FOR OPENING SUCH AN APPARATUS

This nonprovisional application is a Continuation of International Application No. PCT/EP2020/079261, which was filed on Oct. 16, 2020, and which claims priority to German Patent Application No. 10 2019 007 192.1, which was filed in Germany on Oct. 16, 2019, and which are both herein incorporated by reference.

BACKGROUND OF THE INVENTION

Field of the Invention

The invention relates to a device for comminuting pourable feedstock as well as a method for opening a device of this type.

Description of the Background Art

Devices of this type are assigned to the field of mechanical process engineering and are used to convert source materials into an intermediate or end product of a predetermined shape and size. The goal of the conversion process is to generate a uniform product in terms of its shape and size within narrow limits. This is achieved, among other things, in that a sieve is arranged downstream from the comminution zone, whose through fraction meets the requirements of the product within the predefined tolerances.

Comminution goes hand in hand with the fact that, in particular, the components which come into contact with the feedstock are subject to wear and therefore must be replaced at regular time intervals. Moreover, cleaning, maintenance and repair work arise, which require a good accessibility to the interior of the device. The downtimes of a device caused thereby are largely among the determining factors for an economical comminution operation. It is therefore in the interest of the operator of devices of this type to be able to carry out such work as quickly and at the same time as safely as possible.

A cutting mill is known from DE 10 2006 036 738 A1, which has a rotor, whose rotor tools interact with stator tools arranged in a stationary manner on the mill housing for the purpose of comminuting the feedstock. The rotor is surrounded by a sieve over its lower circumferential section, while the upper circumferential section is used to supply the feedstock. The housing transitions into a discharge trough below the sieve, whose hopper-shaped circumferential walls direct the comminuted material to the bottom of the trough, where it is removed from the device in an air stream via a discharge line. The disadvantage of this device arises from the great space requirements at the place of operation and the limited accessibility to the rotor or to the sieve.

A pivot drive for a sieve is described in EP 1 371 420 A1, which moves the sieve downward around a horizontal pivot axis at the upper longitudinal edge of the sieve frame with the aid of hydraulic cylinder piston units. Although this simplifies the disassembly of the sieve, the downward pivoting movement requires a considerable amount of space beneath the rotor, so that devices this type are relatively tall. Particularly in tight spaces, the sieves may not always be pivoted up all the way, which makes the accessibility to the rotor considerably more difficult.

SUMMARY OF THE INVENTION

It is therefore an object of the invention to ensure an optimal accessibility to the interior of the device to be able to carry out work on the rotor and sieve efficiently and safely.

The invention is based on the fundamental idea of opening a device according to the invention in two steps. In a first step, the sieve holder is pivoted around a first pivot axis, by means of which a partial opening of the device is achieved; in a second step, the sieve holder is pivoted around a second pivot axis until a full opening is achieved. The special feature is that the two pivot axes run transversely to each other, whereby kinematic conditions set in, which permit an adaptation to the existing spatial conditions by a combination of different pivoting movements in different spatial directions. The existing amount of space may be optimally used in this way, with the advantage that the sieve holder of devices according to the invention may continue to swing open, and the rotor in the interior of the device is more easily accessible. Work on machine components in the device interior may thus be carried out more easily, faster and more carefully. A further advantage of the invention is that even sieves which extend over more than half the circumference of the rotor may swing open a sufficient distance to provide the personnel with a sufficient workspace when completing the aforementioned activities.

According to the invention, the two pivoting movements may be carried out at least partially at the same time. In contrast, however, it is preferred if the sieve holder is first pivoted around the first axis and then around the second axis, which clearly structures the method sequence and thus simplifies the control of the device.

The first pivot axis advantageously can run in parallel to the rotor axis, so that, when the sieve holder is pivoted, the sieve is evenly lifted up perpendicularly to the rotor axis around the first pivot axis to thereby create more space for pivoting around the second pivot axis.

The first pivot axis may be defined, for example, by two points spaced a distance apart, which are formed by a first pivot bearing and a second pivot bearing, which are both fastened to the housing of the cutting mill, preferably to the upper blade beam.

It is provided to design the pivot bearing in such a way that the sieve holder may be detached from the pivot bearing. For example, the first pivot bearing may have a bearing journal which is coaxial to the pivot axis and which engages with a coaxial bore in the sieve holder. By axially retracting the bearing journal, the first pivot bearing is unlocked, and the sieve holder is released for a pivoting around the second pivot axis.

The second pivot bearing can be designed in such a way that a pivoting of the sieve holder around the first pivot axis as well as the second pivot axis is made possible. It therefore has two degrees of freedom, whereby the machine construction may be simplified, due to the dual function of the second pivot bearing made possible thereby. For example, the second pivot bearing may be formed by a ball joint, whose ball head is rigidly fastened to the housing of the device in the alignment of the first pivot axis, and which interacts with a joint socket arranged on the sieve holder.

The second pivot axis can also be defined by two points spaced a distance apart, which are each formed by a pivot bearing, the one pivot bearing being able to be formed by the aforementioned second pivot bearing having two degrees of freedom, and/or the other pivot bearing being formed by a third pivot bearing also having two or three degrees of freedom, as specifically explained in greater detail below.

It has proven to be particularly advantageous if the second pivot axis is oriented perpendicularly, i.e., following the force of gravity. This prevents the sieve holder from opening automatically and in an uncontrolled manner after being detached from the first pivot bearing, which would represent a source of danger for personnel and the device.

According to the invention, it is not obligatory for the two pivot axes to be perpendicular to each other; however, a perpendicular arrangement of the two pivot axes with respect to each other represents a preferred specific embodiment, since a device according to the invention may be opened very quickly and wide and also extremely precisely in this way.

The first pivot axis and the second pivot axis can be arranged relative to each other in such a way that they are situated in a common plane at least after being swung open around the first pivot axis and thus upon reaching the second position. In this arrangement, the first pivot axis and the second pivot axis intersect at a point, which preferably coincides with the second pivot bearing. Only when the two pivot axes have assumed this relative position with respect to each other are the kinematic requirements met in order for the pivoting action around the second pivot axis to be able to begin.

This circumstance may be used in a further example to make the process of opening the device safer. In this specific embodiment, the first pivot axis and the second pivot axis are spaced a distance apart in the first position of the sieve holder and consequently do not form an intersection point. During the course of the pivoting action around the first pivot axis, the second pivot axis is moved a distance relative to the first pivot axis until a common intersection point results, and the two pivot axes are thus situated in a common plane. Until this event occurs, the sieve holder may not be moved around the second pivot axis, so that an automatic locking of the sieve holder is thus achieved, which prevents an unintentional premature execution of the pivoting action around the second pivot axis.

In an advantageous implementation of this idea, it is provided to displace the second pivot axis during the pivoting action around the first pivot axis in parallel, i.e., to move it in a translatory manner. Structurally this is achieved, for example, in that the second pivot axis is defined by a third pivot bearing, which not only has the pivoting movement around the second pivot axis but also a further degree of freedom, namely a rotational movement by the third pivot bearing around a rotation axis in parallel to the first pivot axis.

It is advantageous if the third pivot bearing also permits the compensation of linear displacements in the direction of the second pivot axis as a third degree of freedom to prevent constraints between the pivot drive and the sieve holder. This advantage takes effect, in particular, in linear drives whose driven part, for example a push rod, does not follow a circular movement around the first pivot axis but rather moves in a straight line. According to the invention, linear drives are preferred means for pivoting the sieve holder around the first pivot axis, since they permit the pivoting movement to be easily controlled in an extremely sensitive manner.

The open side of the sieve holder facing the rotor can be limited upwardly by an upper edge and downwardly by a lower edge. In the closed first position of the device, the sieve holder abuts the housing of the device with its upper edge assigned to the first pivot axis or the upper blade beam and by its lower edge assigned to the lower blade beam. The upper edge and the lower edge are situated approximately diametrically opposed to the rotor axis, the upper edge having a horizontal offset with respect to the lower edge. In this way, the upper edge and the lower edge together define a connecting plane, which is inclined at an angle $\alpha$ with respect to a vertical, with the advantage that, during the pivoting around the first pivot axis, the sieve holder's own weight supports the pivoting movement. Angle $\alpha$ is preferably between 10° and 40°, in particular between 20° and 30°.

The sieve holder can be pivoted by a maximum of 30° around the pivot axis, which yields opening angle ß between the sieve holder and the device. In most cases, the geometric conditions which set in make it possible to begin pivoting around the second axis. The extent of the pivoting after the first step also determines the inclination of the sieve holder after the second step. Under this aspect, further preferred specific embodiments of the invention provide a pivoting of the sieve holder around the first pivot axis by a maximum of 40°, in exceptional cases by a maximum of 60°.

The extent of the pivoting of the sieve holder around the second pivot axis is a determining factor in the accessibility to the interior of the device. To be able to carry out work on the rotor and/or the sieve quickly and carefully, a pivoting by at least 90° is advantageous, preferably by 90° to 180°.

It is further preferred if a vertical distance a of the upper pivot axis to the rotor axis approximately corresponds to vertical distance b of the rotation axis to the third pivot bearing. This distance ratio has proven to be extremely favorable for swinging open the sieve holder, in particular around the second pivot axis.

Although the subject matter of the exemplary embodiment is a cutting mill, shredders and the like are also within the scope of the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 10:
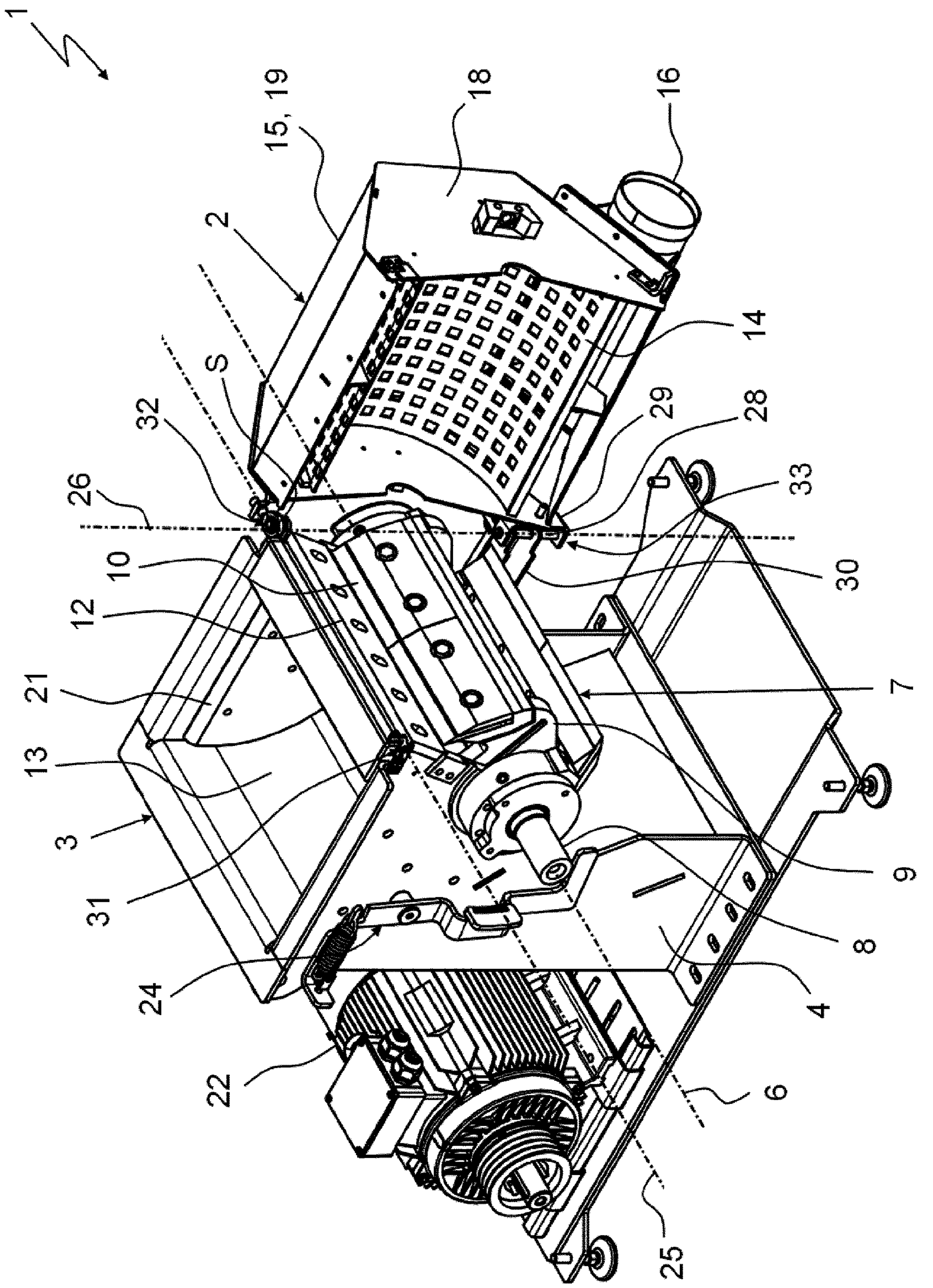
FIG. 10 shows an oblique view of the device according to the invention, including a sieve holder open all the way.
Figure 11:
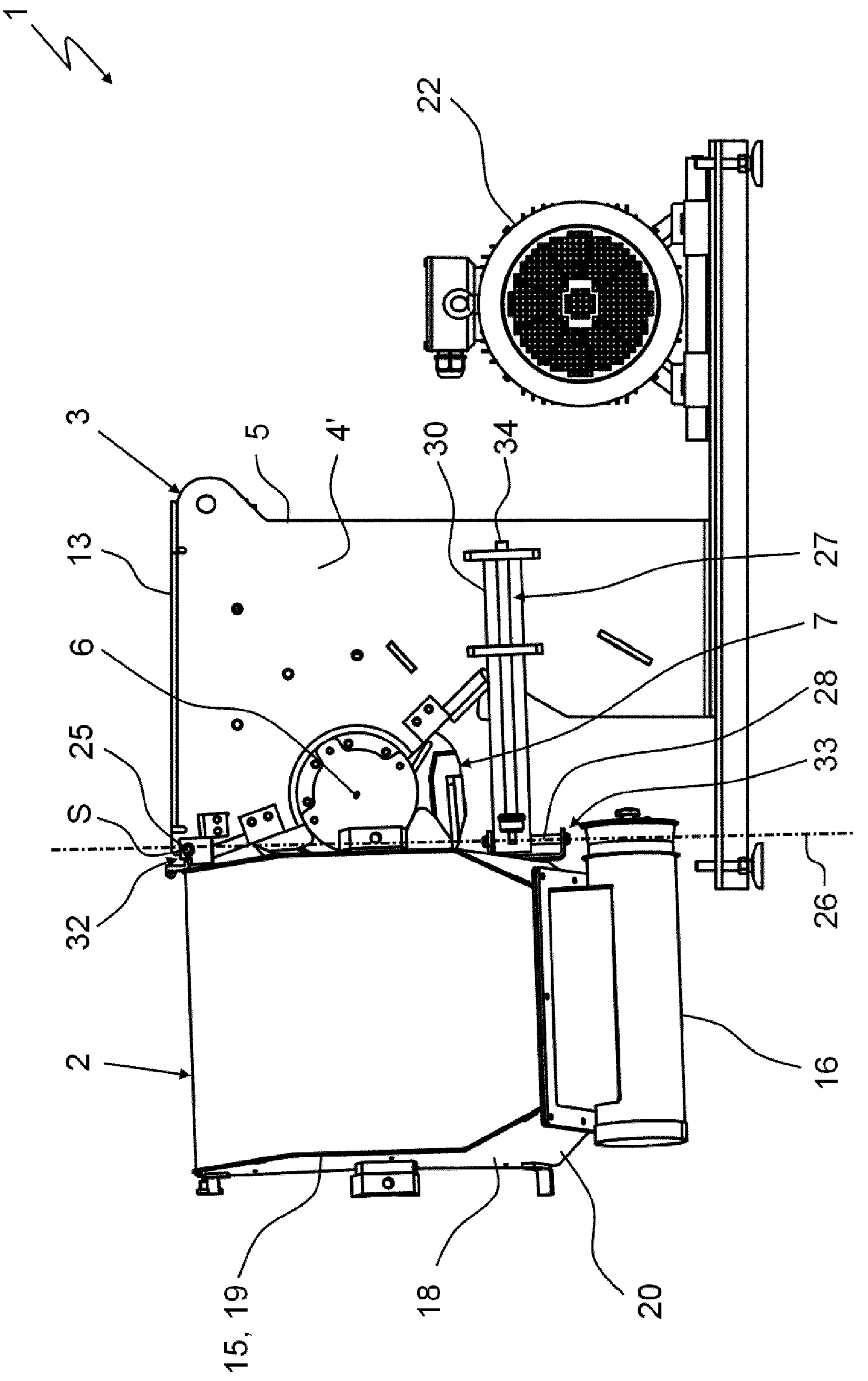
FIG. 11 shows a side view of the device illustrated in FIG. 10.
Figure 12:
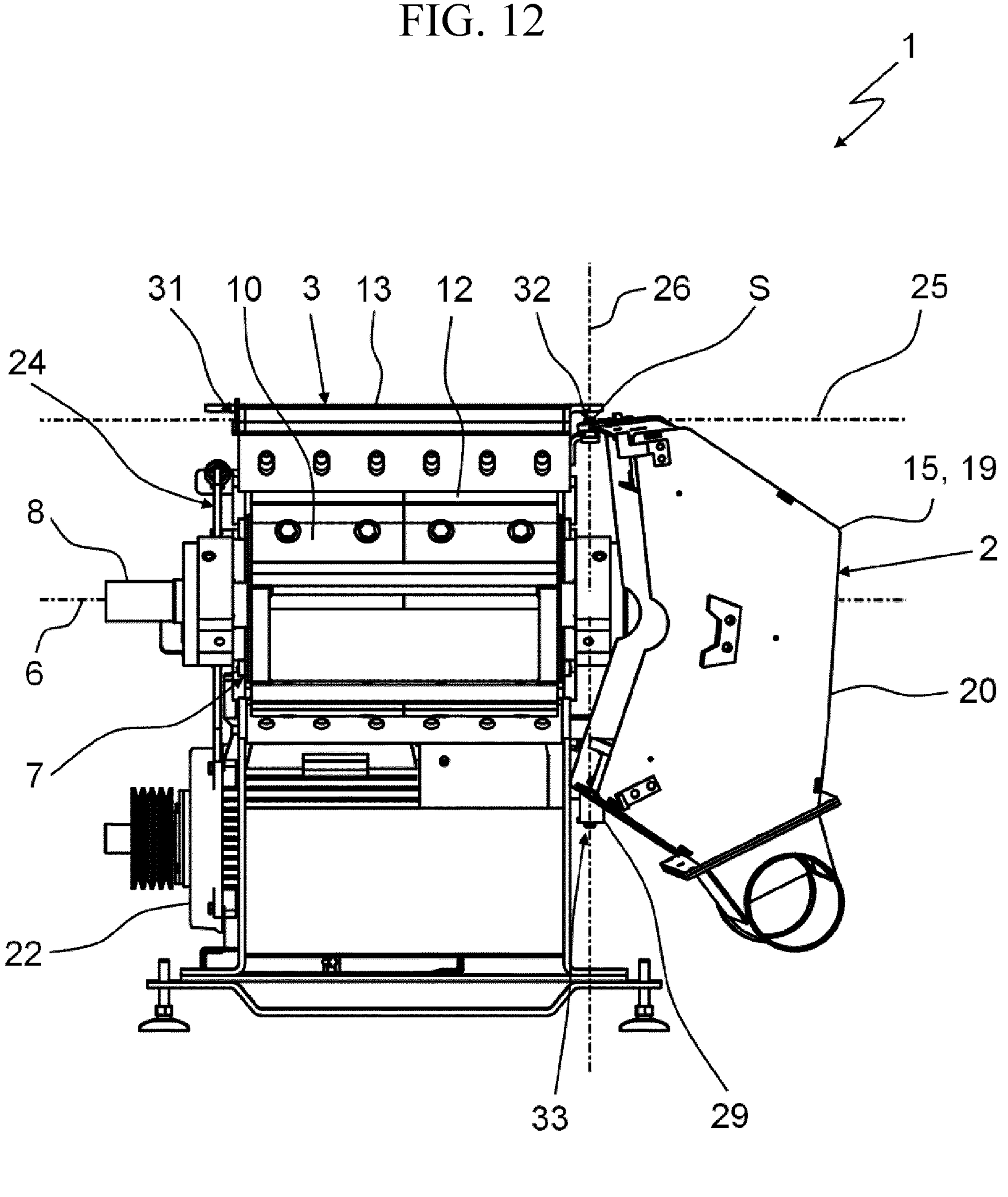
FIG. 12 shows a front view of the device illustrated in FIG. 10.

The structural design of a device according to the invention arises from a combined examination of FIGS. 1 through 12. FIGS. 1 through 5 show a device according to the invention in the form of a cutting mill 1 in the state ready for operation, i.e., in a first position, in which sieve holder 2 is closed. To open cutting mill 1 for repair, maintenance and cleaning purposes, sieve holder 2 may be swung open from housing 3 in two steps. FIGS. 6 through 9 show partially open cutting mill 1 in a second position in a state after the end of the first step; FIGS. 10 through 12 show cutting mill 1 in a third position, in which sieve holder 2 is opened all the way after the end of the second step.

Cutting mill 1 includes a housing 3, which encloses a comminution chamber 40 with its transverse walls 4, 4' and longitudinal walls 5. A pivot bearing 41, in which a rotor 7, rotating around a horizontal rotation axis 6, is rotatably supported, is arranged on the outer sides of transverse walls 4, 4'. Rotor 7 is essentially made up of a drive shaft 8, on which multiple rotor disks 9 are rotatable fixedly seated in an axially staggered manner. Rotor tools 10, which describe a common orbit with their blades, are distributed uniformly over the circumference of rotor 7 on rotor disks 9. Rotor 7 is driven by a motor 22, which sets drive shaft 8 in rotation via drive belts and a multi-groove disk seated on drive shaft 8.

To supply the feedstock, cutting mill 1 includes a hopper-shaped material infeed 13 upstream from rotor 7, which is limited in the axial direction by transverse walls 4, 4', which are each covered by a wear plate 21 in this region. Material infeed 13 has a base 42, which is inclined in the direction of rotor 7, on which the feedstock slides to rotor 7 due to the force of gravity.

Figure 1:
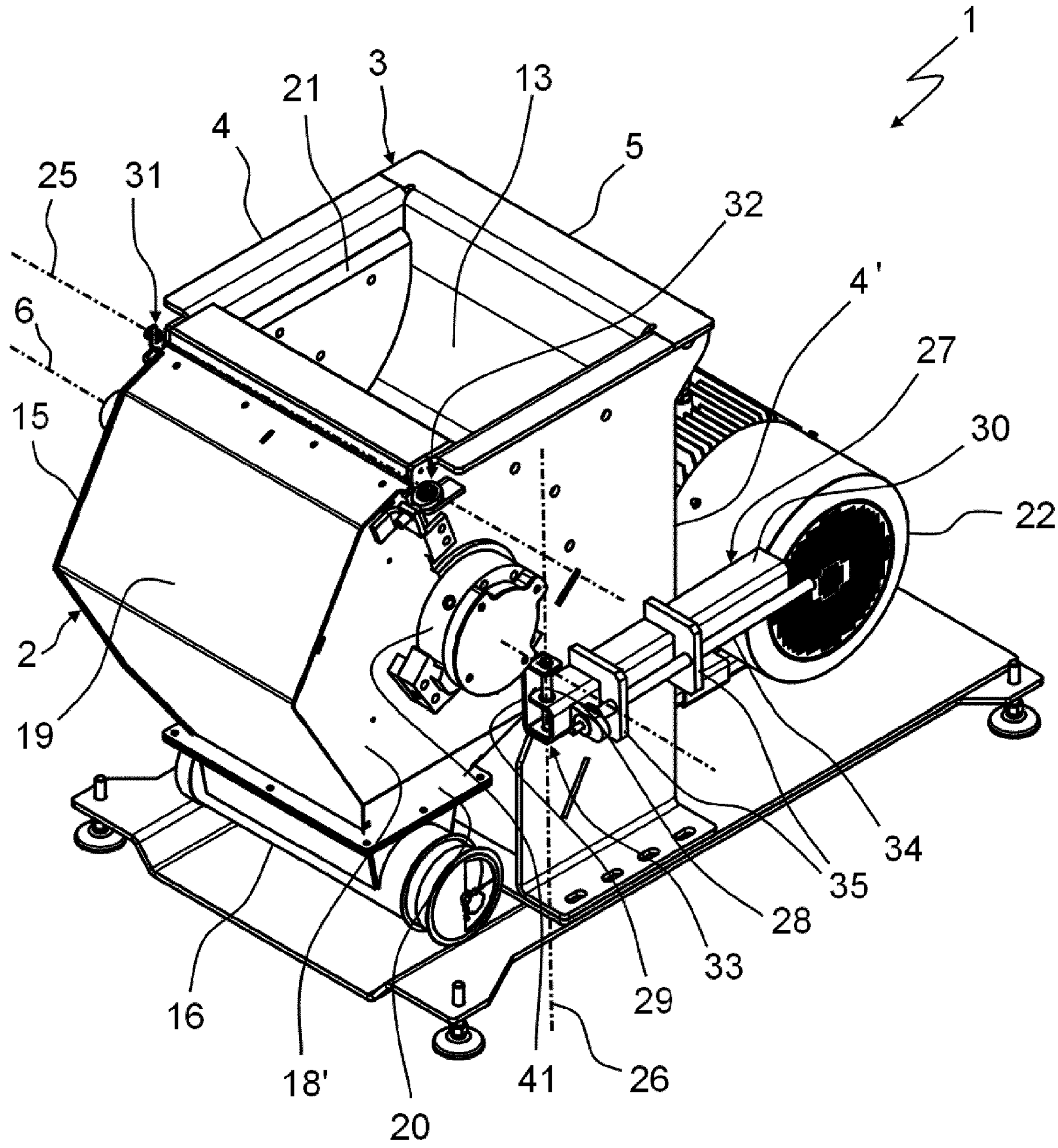
FIG. 1 shows an oblique view of a device according to the invention, including a closed sieve holder.
Figure 2:
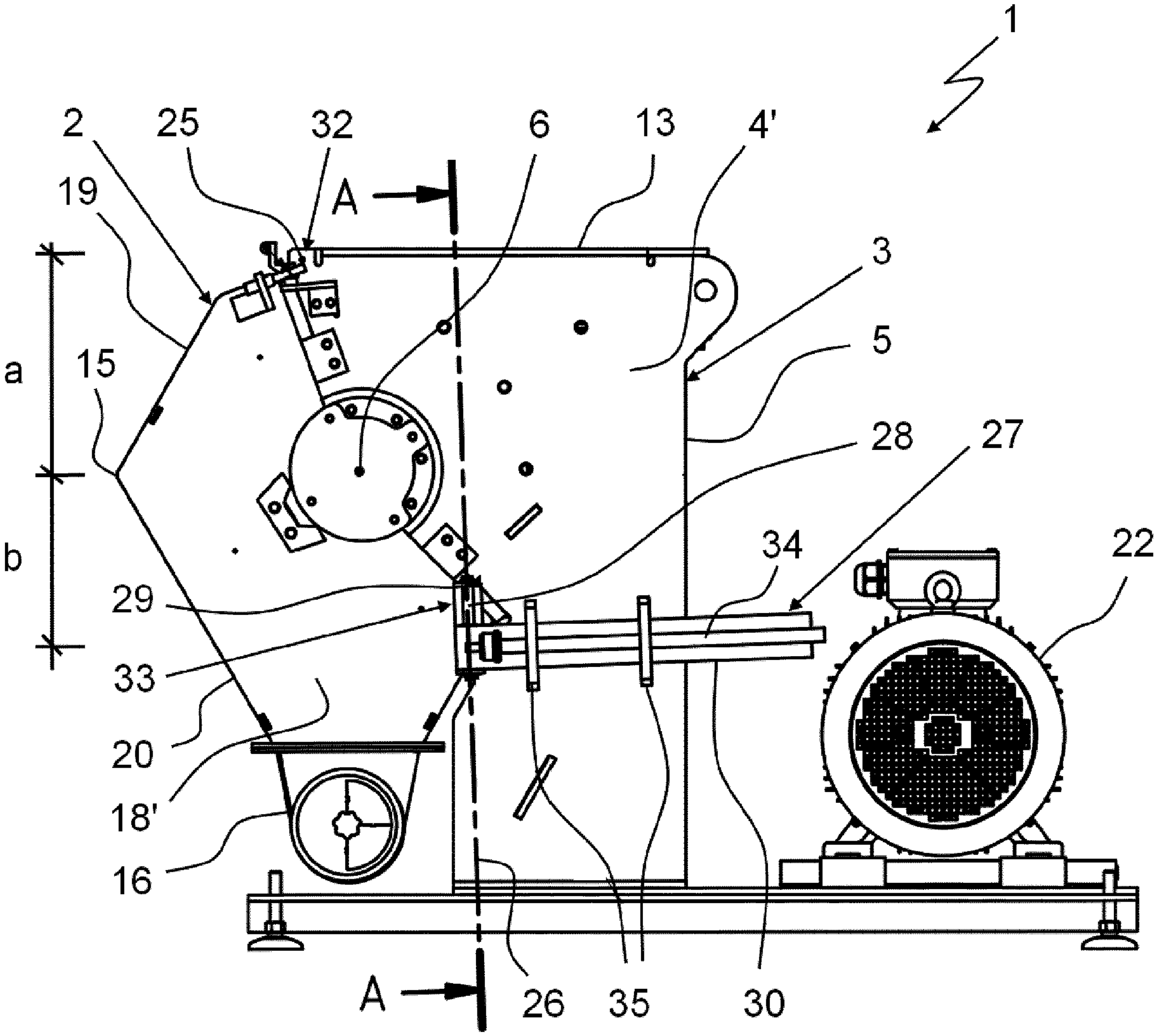
FIG. 2 shows a side view of the device illustrated in FIG. 1.
Figure 3:
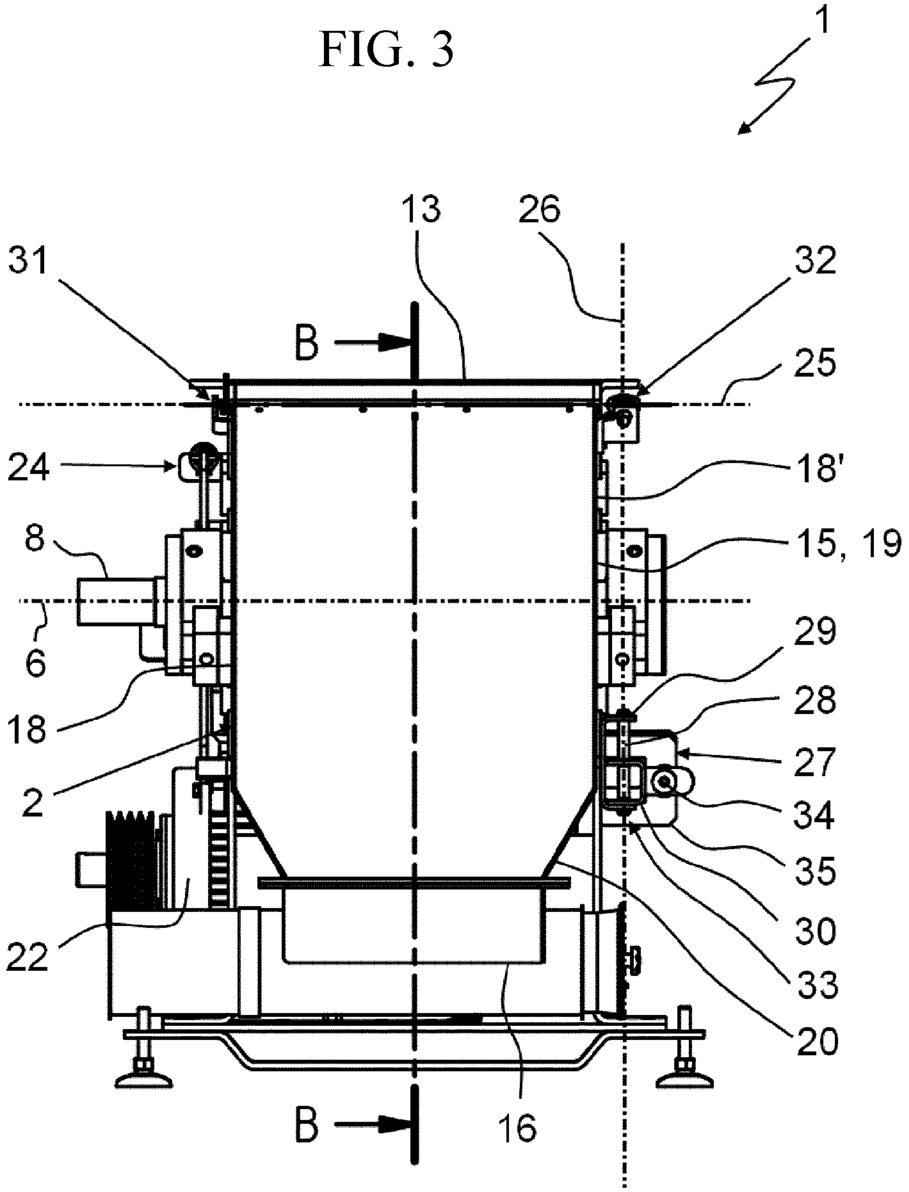
FIG. 3 shows a front view of the device illustrated in FIG. 1.
Figure 4:
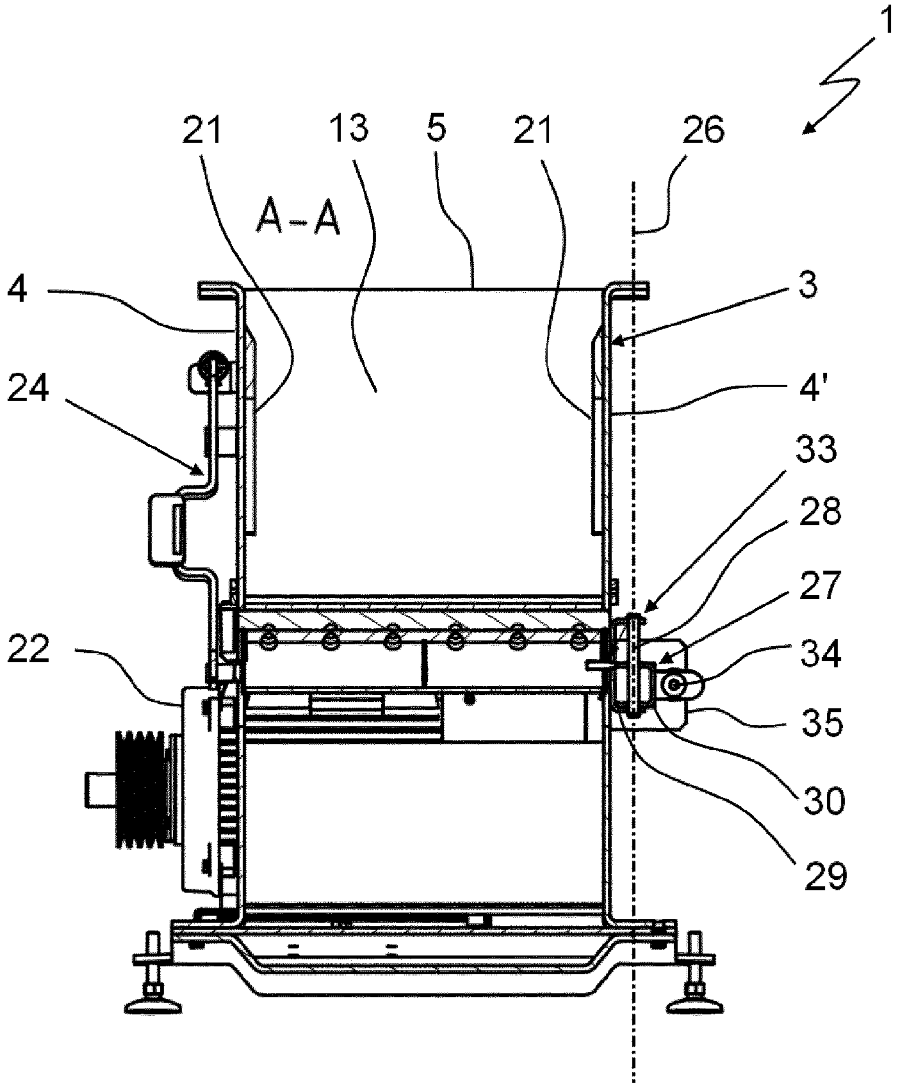
FIG. 4 shows a sectional view of the device illustrated in FIG. 1 along the plane marked by A-A in FIG. 2.
Figure 5:
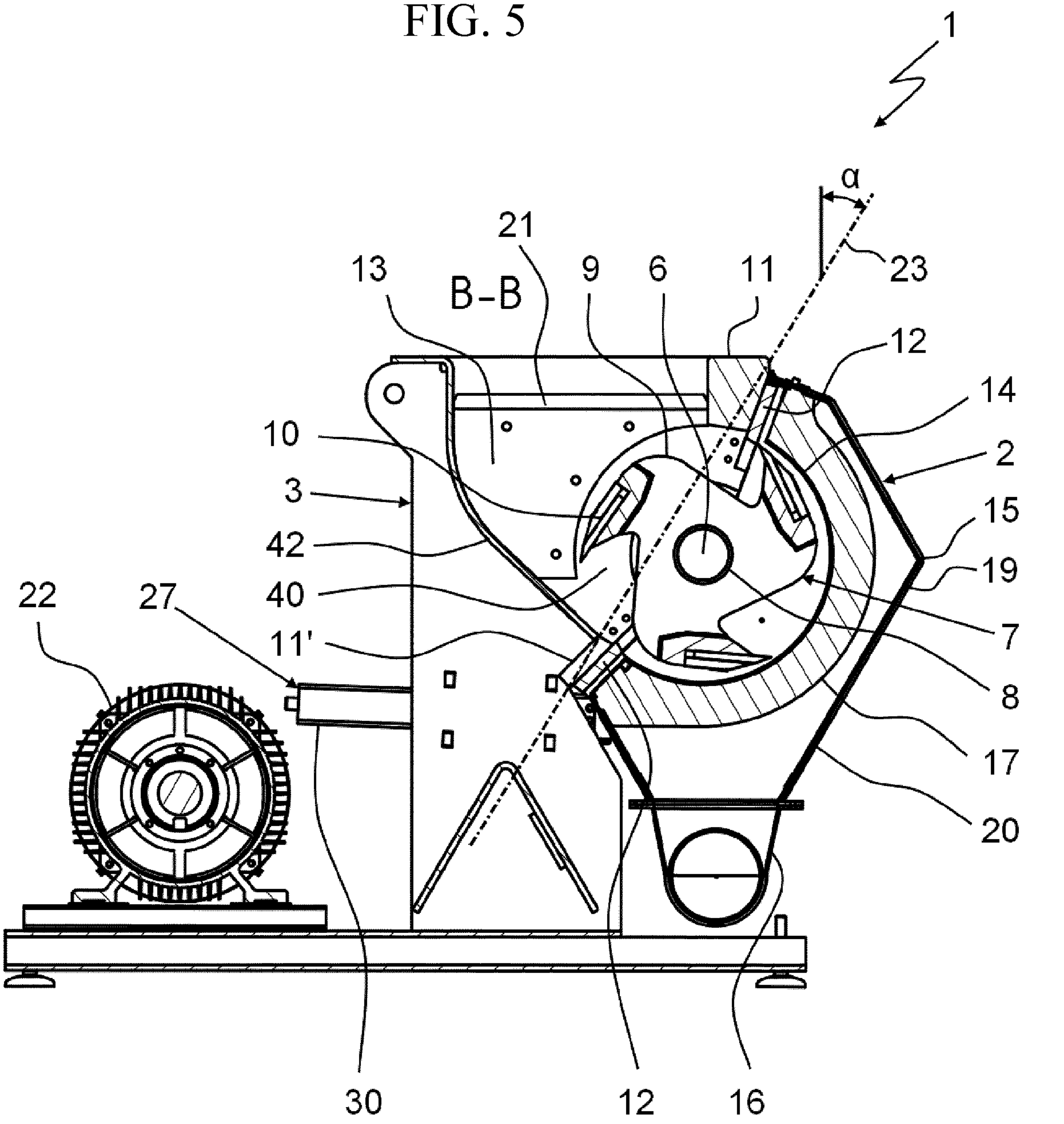
FIG. 5 shows a sectional view of the device illustrated in FIG. 1 along the plane marked by B-B in FIG. 3.
Figure 6:
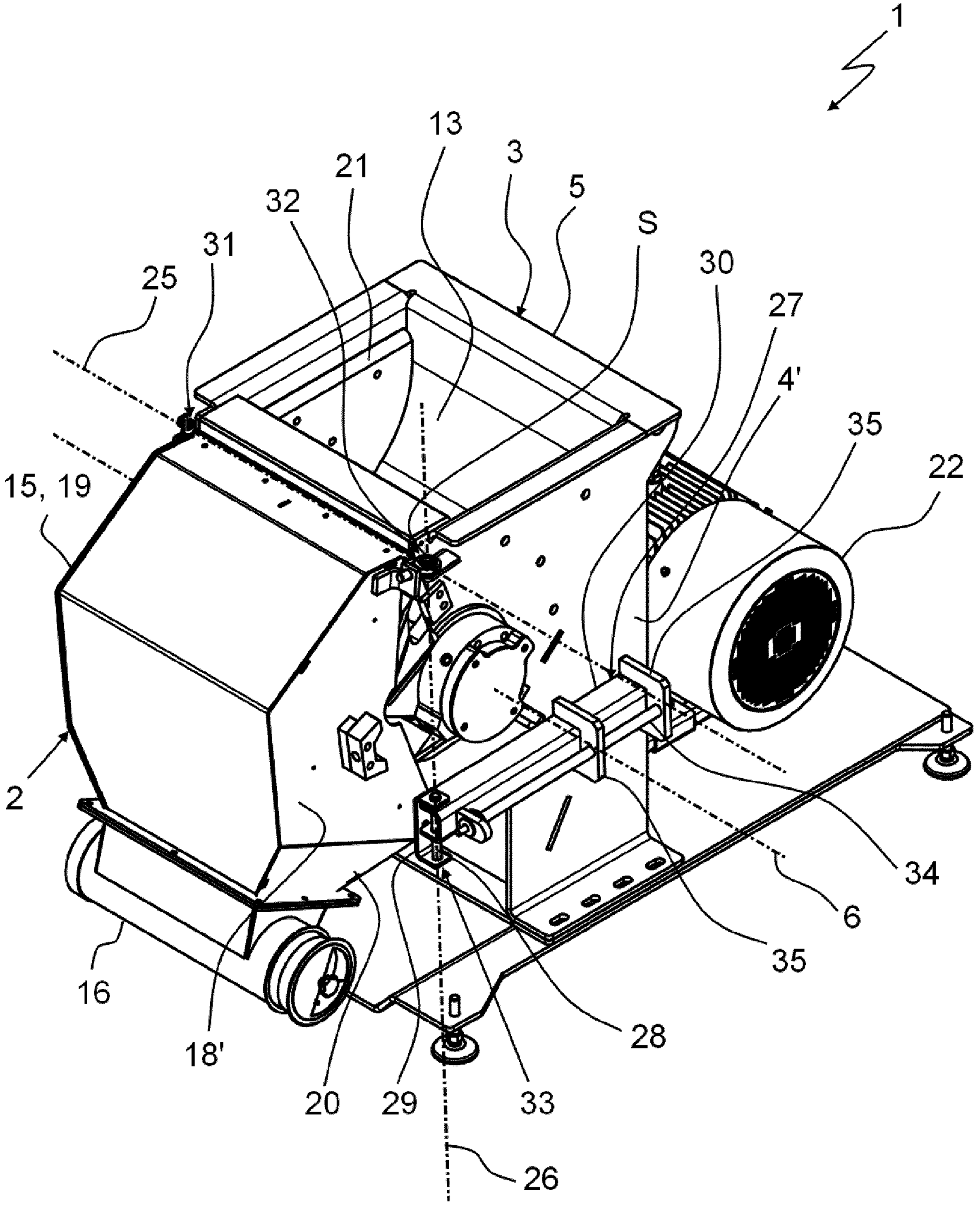
FIG. 6 shows an oblique view of the device according to the invention, including a partially open sieve holder.
Figure 7:
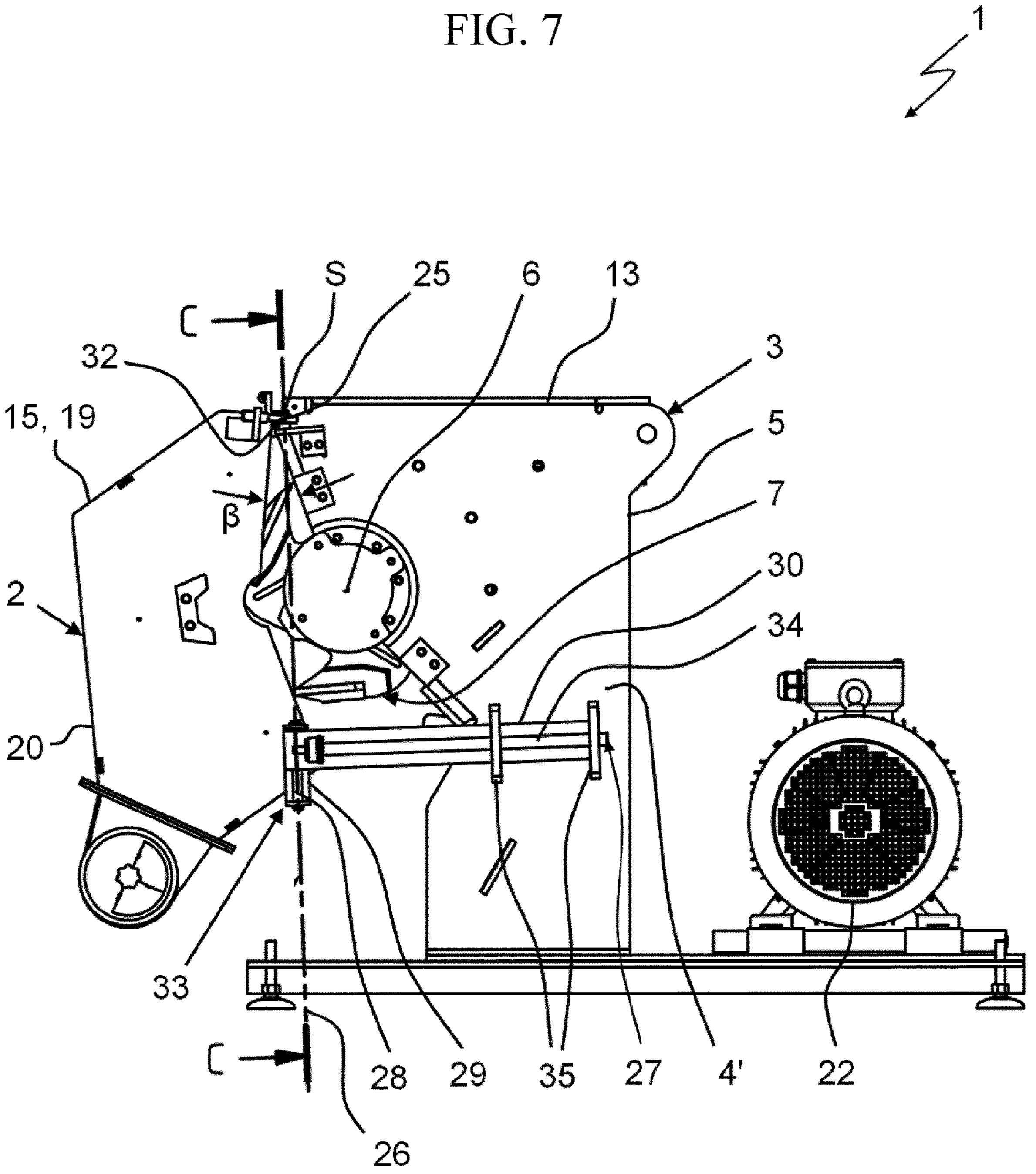
FIG. 7 shows a side view of the device illustrated in FIG. 6.
Figure 8:
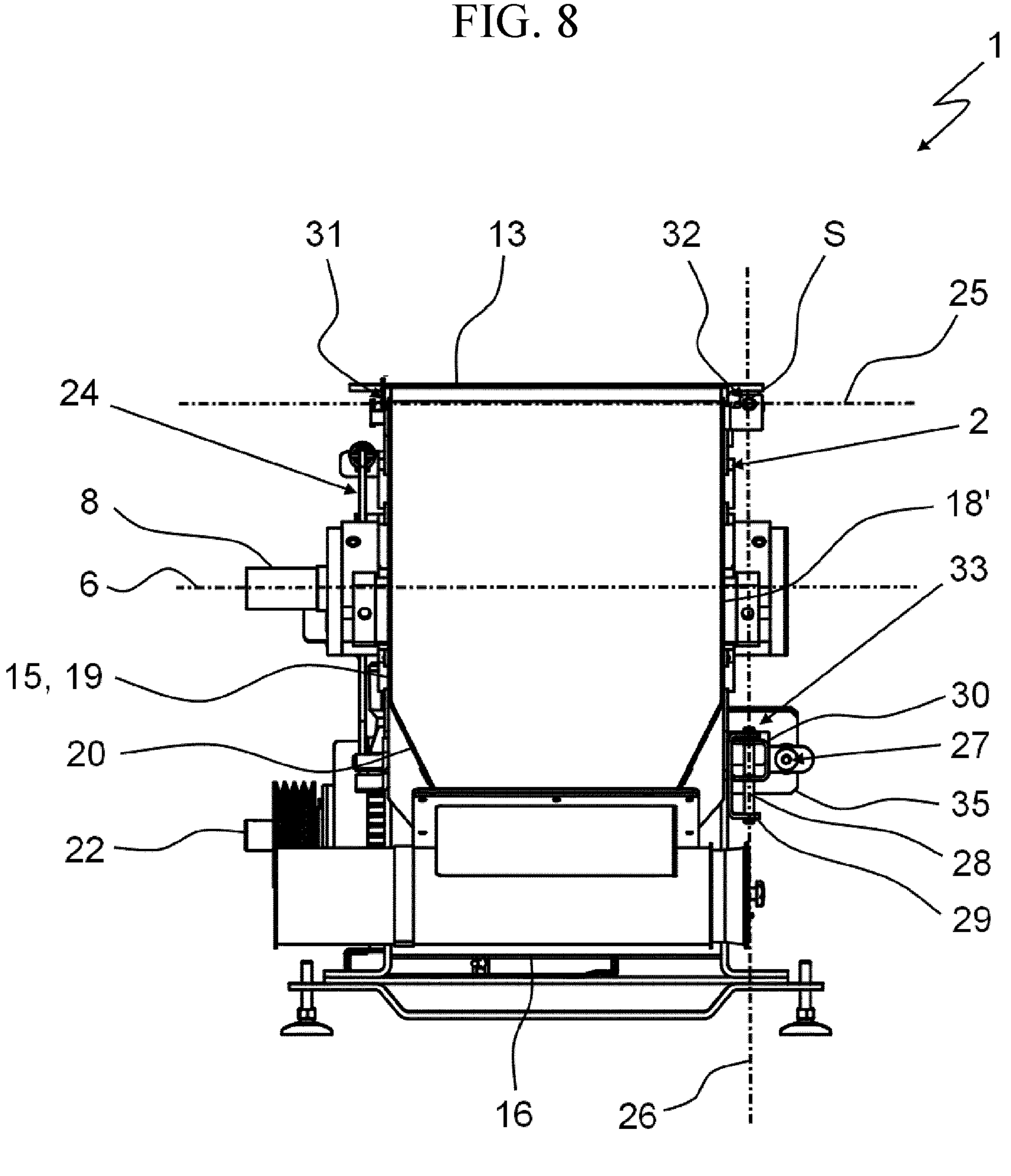
FIG. 8 shows a front view of the device illustrated in FIG. 6.
Figure 9:
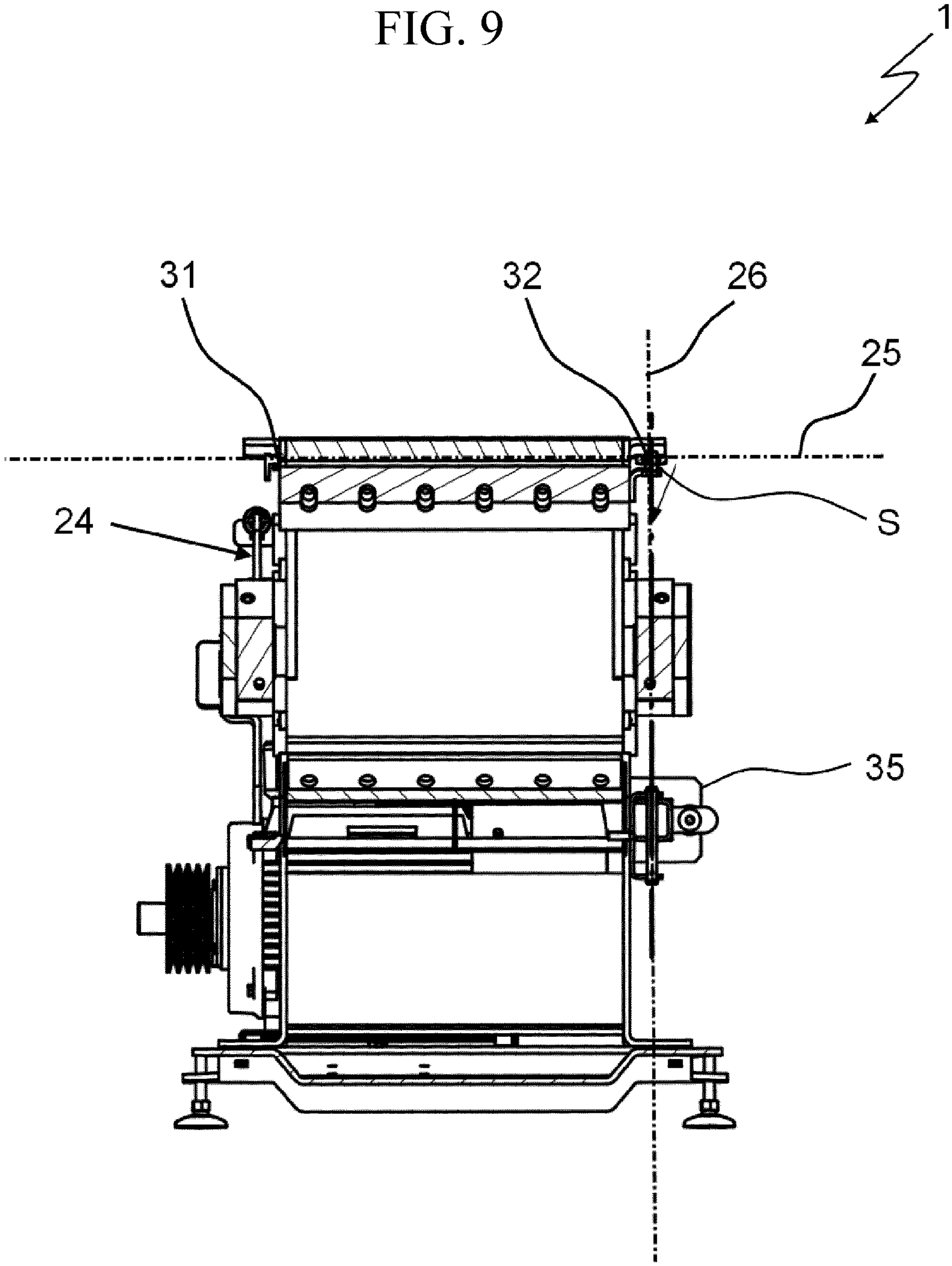
FIG. 9 shows a sectional view of the device illustrated in FIG. 6 along the plane marked by C-C in FIG. 7.

Housing 4 furthermore comprises two massive blade beams 11, 11' axis-parallel to rotation axis 6, which connect transverse walls 4, 4' to each other and are situated approximately diametrically opposed to rotation axis 6 (FIG. 5). Lower blade beam 11' is situated offset in the direction of material infeed 13 with respect to a vertical plane through axis 6 and forms the lower end of material infeed 13. Upper blade beam 11 is situated offset in the in the opposite direction above the vertical plane outward through axis 6 in the direction of sieve holder 2 and forms the upper end of material infeed 13. In this way, blade beams 11 and 11' span a connecting plane 23, which runs obliquely from the lower inside to the upper outside at an angle $\alpha$ of preferably more than 10°, in particular more than 20°, with respect to a vertical. In the present exemplary embodiment, angle $\alpha$ is approximately 30° (FIG. 5).

Upper stator blades 12 and lower stator blades 12' situated opposite rotor 7 are removably fastened to blade beam 11, 11' with the aid of blade holding plates and screws. The active edges of stator blades 12, 12' are situated opposite rotor tools 10 in the axial direction, with which they interact to comminute the feedstock.

The circumferential section of rotor 7 facing away from material infeed 13 is used to classify the comminuted material with the aid of a sieve 14 and to capture and remove the through fraction with the aid of an discharge trough 16. Sieve 14 and discharge trough 16 are part of sieve holder 2, as is described in greater detail below.

Sieve 14 of sieve holder 2 extends over the entire axial length of rotor 7, maintaining a radial gap, and over a circumferential region of rotor 7, which is limited by upper stator blades 12 and lower stator blades 12'. In the present exemplary embodiment, sieve 14 extends over a circumferential region of more than 180°. Sieve 14 is held by multiple arc-shaped ribs 17, which are fastened by their ends to sieve holder 2 in plane-parallel vertical planes with respect to axis 6 and support sieve 14 in the radial direction by their inner circumference.

Sieve holder 2 also comprises a hood-like sieve holder housing 15, which is open in the direction of rotor 7, accommodates ribs 17 and sieve 14 and permits a tight connection of sieve holder 2 to housing 3 in the region of connecting plane 23. Sieve holder housing 15 includes front walls 18, 18', which continue transverse walls 4, 4, and a circumferential wall 19, which connects front walls 18, 18'. Circumferential wall 19 forms a hopper 20, which is downwardly open in the lower region of sieve holder 2 and which opens into an discharge trough 16, which is rigidly fastened to sieve holder housing 15.

To pivotably fasten sieve holder 2 to cutting mill 1, a first pivot bearing 31 is arranged on the outside of transverse wall 4 in the end region of upper blade beam 11, and a second pivot bearing 32 is arranged on the outside of opposite transverse wall 4' in the opposite end region of blade beam 11, which together form a first pivot axis 25 having an approximately horizontal orientation. Sieve holder 2 is pivotably held in the two pivot bearings 31, 32 by its upper edge in parallel to axis 6. First pivot bearing 31 is lockable and unlockable, i.e., sieve holder 2 may be detached from housing 3 in first pivot bearing 31. Second pivot bearing 32 permits not only the pivoting around first pivot axis 25 but also a pivoting around a second pivot axis 26, which is explained in detail later on. For example, second pivot bearing 32 is made up of a bearing having at least two degrees of freedom, in particular a ball joint or the like. A locking mechanism 24 is also arranged on transverse wall 4 (FIG. 19), which, in the closed state of sieve holder 2 in the first position, locks the latter securely to housing 3.

To pivot sieve holder 2 around first pivot axis 25, cutting mill 1 includes a drive 27 suitable for this purpose, which in the present exemplary embodiment comprises a linear guide 35 having two guide frames spaced a distance apart and aligned with each other, which are rigidly fastened to the outside of transverse wall 4' of housing 3, and a push rod 30, which is displaceably supported in the aligned guide frames. The longitudinal axis of push rod 30 is oriented horizontally or inclined slightly downward in the direction of sieve holder 2.

Push rod 30 is linearly adjustable relative to housing 3 with the aid of a motor-driven or manually driven threaded spindle 34. Threaded spindle 34 is rotatably held by its one end in a holder on the front end of push rod 30 and also extends through threaded bores in the guide frames axis-parallel to push rod 30. The push rod itself or the drive for push rod 30 may also be formed by a cylinder piston unit or the like.

Linear drive 27 is linked to sieve holder 2 via a third pivot bearing 33, which is arranged on the outside of front wall 18' of sieve holder housing 15 in the lower edge region facing lower blade beam 11'. Third pivot bearing 33 is thus situated below second pivot bearing 32 or rotation axis 6 and moves on a circular path around first pivot axis 25 during the pivoting of sieve holder 2.

Third pivot bearing 33 comprises an approximately vertically oriented axis 28, whose ends are held by the two legs of a U-shaped clip 29. Axis 28 defines a second approximately vertical pivot axis 26. First pivot axis 25 and second pivot axis 26 thus run transversely to each other, preferably approximately perpendicularly, and together define two plane-parallel planes, which maintain a distance to each other in the closed first position of sieve holder 2, which corresponds to the distance between first pivot axis 25 and second pivot axis 26. Second pivot axis 26 and second pivot bearing 32 are situated in a common vertical plane on first pivot axis 25.

Third pivot bearing 33 is fastened to sieve holder 2 in such a way that, during a linear movement of push rod 30, third pivot bearing 33 moves on a circular path around first pivot axis 25, while axis 28 executes a translatory movement, which corresponds to a parallel displacement of second pivot axis 26 in the direction of movement of push rod 30. Axis 28 retains its original orientation.

This is made possible in that the free end of push rod 30 has two bores situated a vertical distance apart, which are penetrated by axis 28 with clearance, and in that clip 29, together with axis 28, is rotatably fastened to front wall 18' around a rotation axis in parallel to first pivot axis 25. In this way, axis 28 is held in a vertical orientation at any point in time during the actuation of linear drive 27. At the same time, a relative movement is possible between axis 28 and push rod 30 in the vertical direction.

During operation, a cutting mill 1 according to the invention is in the first position illustrated in FIGS. 1 through 5. When linear drive 27 is in the inserted state, sieve holder 2 is pivoted against housing 3 of cutting mill 1 and closes it in connecting plane 23. Sieve holder 2 is locked in this position with the aid of locking mechanism 24.

Sieve holder 2 is opened in two steps, a pivoting movement of sieve holder 2 around first pivot axis 25 being effectuated in a first step. For this purpose, locking mechanism 24 is first released, while the locking of first pivot bearing 31 is left in place. By subsequently pulling out linear drive 27, sieve holder 2 is pivoted around first pivot axis 25 by angle ß (FIG. 7) until the partially open second position of cutting mill 1 is reached. FIGS. 6 through 9 show this state.

Due to the described design of third pivot bearing 33, second pivot axis 26 undergoes a parallel displacement during the first step in the direction of the movement of linear drive 27, which is continued until second pivot bearing 32 is in alignment with second pivot axis 26. In this position, first pivot axis 25 and second pivot axis 26 define a common plane, i.e., first pivot bearing 31, second pivot bearing 32 and third pivot bearing 33 are in the same plane. Only after this second position is reached is it possible to carry out the second step for opening cutting mill 1. Prior to reaching the second position of sieve holder 2, the kinematics according to the invention bring about a blocking effect and thereby prevent the second step from being initiated prematurely.

In the second step, first pivot bearing 31 is then released, and sieve holder 2 is swung open to the side around second pivot axis 26 manually or by machine. Throughout the second step, second pivot axis 26 is stabilized by second pivot bearing 32 and third pivot bearing 33. The vertical orientation of second pivot axis 26 prevents sieve holder 2 from posing a danger to the personnel by sieve holder 2 being unintentionally pivoted. After the conclusion of the second step, cutting mill 1 is open all the way, which is illustrated in FIGS. 10 through 12. The opening angle between housing 3 and sieve holder 2 is 90°.

The described steps are carried out in the reverse order to close cutting mill 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

What is claimed is:

1. A device for comminuting pourable feedstock, the device comprising:
- a housing that encloses a portion of a comminution chamber, in which a rotor rotating around a rotation axis is arranged, the rotor being equipped with rotor tools over a circumference of the rotor;
- a sieve holder including a sieve, which extends along a circumferential section of the rotor and separates the sufficiently comminuted material;
- a material infeed for loading the rotor with feedstock; and
- a material discharge for removing the sufficiently comminuted material,
- wherein the sieve holder is pivotable around a first pivot axis from a closed first position into an open second position for the purpose of opening the housing,
- wherein the sieve holder is additionally pivotable around a second pivot axis into an open third position, and
- wherein the first pivot axis and the second pivot axis run transversely with respect to each other.

2. The device according to claim 1, wherein the first pivot axis and the second pivot axis run transversely to each other at an angle of 90°.

3. The device according to claim 1, wherein the second pivot axis is vertically oriented.

4. The device according to claim 1, wherein the first pivot axis and the second pivot axis define a common plane or form a common intersection point in the open second position.

5. The device according to claim 1, wherein the first pivot axis is formed by a first pivot bearing and a second pivot bearing, situated at a distance therefrom, the sieve holder being detachably held in the first pivot bearing.

6. The device according to claim 5, wherein the second pivot axis is formed by the second pivot bearing and a third pivot bearing, situated at a distance therefrom, the second pivot bearing having at least two degrees of freedom and being formed by a ball joint.

7. The device according to claim 5, wherein the second pivot axis is formed by the second pivot bearing and a third pivot bearing, situated at a distance therefrom, the third pivot bearing having at least two degrees of freedom or at least three degrees of freedom.

8. The device according to claim 7, wherein the third pivot bearing has a vertical axis, which is rotatably supported around a rotation axis in parallel to the first pivot axis.

9. The device according to claim 5, wherein the second pivot axis is formed by the second pivot bearing and a third pivot bearing situated at a distance therefrom, the distance of the first pivot bearing from the rotation axis corresponding to a distance of the third pivot bearing from the rotation axis.

10. The device according to claim 1, further comprising a drive for pivoting the sieve holder into the open second position, which extends between the housing and the sieve holder.

11. The device according to claim 1, wherein the sieve holder abuts the housing of the device in a connecting plane, the connecting plane enclosing an angle α with a vertical, the angle being greater than zero.

12. A method for opening a device according to claim 1, the method comprising:

pivoting, in a first step, the sieve holder around the first pivot axis until the open second position is reached; and pivoting, in a second step, around the second pivot axis until the open third position is reached, the first pivot axis and the second pivot axis forming a common intersection point S, at least in the open second position of the sieve holder.

13. The method according to claim 12, wherein the second pivot axis is displaced in a translatory manner when carrying out the first step.

14. The method according to claim 12, wherein, when the first step is carried out, the sieve holder is pivoted around the first pivot axis by a maximum of 60°.

15. The method according to claim 12, wherein, when the second step is carried out, the sieve holder is pivoted by at least 90° and/or by a maximum of 180°.

* * * * *